UNITED STATES PATENT OFFICE.

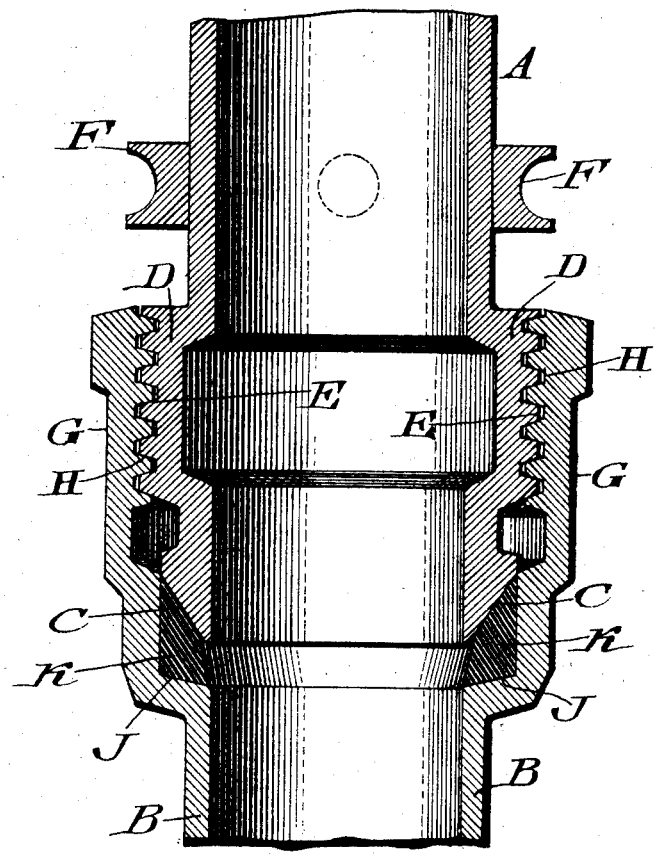

CHARLES A. BLESSING, OF PHILADELPHIA, PENNSYLVANIA.

PIPE-COUPLING.

No. 927,101.　　　　Specification of Letters Patent.　　　　Patented July 6, 1909.

Application filed January 18, 1906. Serial No. 296,640.

*To all whom it may concern:*

Be it known that I, CHARLES A. BLESSING, a citizen of the United States, residing in the city and county of Philadelphia, State of Pennsylvania, have invented a new and useful Pipe-Coupling, of which the following is a specification.

My invention consists of a pipe connection or coupling embodying a novel construction of the opposite pipe members and a gasket or packing for the joint thereof, whereby said packing is powerfully compressed and firmly seated and said joint is reliably closed against leakage.

The figure represents a longitudinal section of a pipe connection or coupling embodying my invention.

Similar letters of reference indicate corresponding parts in the figures.

Referring to the drawings: A and B designate respectively members or portions of pipes to be fitted and coupled. The end of the portion of the member A is conical or tapering as at C. Adjacent to said end on the side of said member A, is an offset D, whose exterior has screw-threads E thereon, said member A also having on its exterior the recessed collar F for the application of a spanner or wrench for rotating said member. On the end of the member B is the bell G whose interior has screw-threads H thereon, the same being adapted to engage with the threads E of the neck D. On the interior of the bell at what may be termed the base thereof is an inturned shoulder J, which with the adjacent wall of the bell forms a chamber to receive the gasket or packing K, the inner face of said shoulder being somewhat inclined providing a seat for said gasket or packing which is composed of a ring of suitable material in cross section of the form of a trapezium, one face of which is adapted to be engaged by the shoulder C. It will be seen also when the packing is located and the pipe members fitted to each other and either member properly rotated, in the present case, the member A, the shoulder C advances against the adjacent face of the packing and contacts therewith, thus compressing said packing against the shoulder J and the contiguous side of the bell G and tightly closing the joint between the pipe members at all places with which the packing is contiguous, this being especially due to the conical or inclined shoulder C which rides upon the contiguous face of the packing and acts as a wedge thereagainst, thus compressing the packing in both longitudinal and lateral directions, so that it is most effective in results, both firmly holding the packing in its place and effecting a perfectly tight joint. As the face of the gasket or packing, which contacts with the inner face of the shoulder J, is inclined, the contact faces form a wedging action of the gasket or packing against said shoulder, the face of the packing sliding on the shoulder J in the compression of the same, so that the packing is most tightly seated, the compression being rendered more effective owing to the different inclinations of the opposite faces of the packing. The gasket K is made of metal or any other suitable material.

The threaded-offset D and the threaded portion of the bell G are of greater diameter than the side wall of the shoulder J, which is occupied by the gasket K consequently said gasket can be passed through the threads of the bell without interference of the latter and so be seated on the shoulder J without being distorted or otherwise changed in shape considering that it is comparatively unflexible owing to its metallic or other dense nature.

Having thus described my invention, what I claim as new and desire to secure by Letters Patent, is:

In a pipe coupling, a member provided with a bell having at its base an inturned shoulder, a chamber beyond said shoulder and interior screw threads of greater diameter than the outer wall of said chamber, and a solid packing gasket disposed in said chamber and seated on said shoulder and having a conical end said packing gasket having its opposite faces formed on different inclines, combined with a coöperating member having exterior threads engaging the threads of the bell and a conical inner end engaging the conical face of the gasket the gasket being of greater height than the length of the conical end of said coöperating member, whereby the lower end of the latter is retained above the bottom of said shoulder.

CHARLES A. BLESSING.

Witnesses:
JOHN A. WIEDERSHEIM,
S. R. CARR.